United States Patent [19]

Welker

[11] Patent Number: 4,721,835

[45] Date of Patent: Jan. 26, 1988

[54] MICROWAVE BREWING CUP

[76] Inventor: Helmut Welker, R.D. 2 Horton Rd., Jamestown, N.Y. 14701

[21] Appl. No.: 915,141

[22] Filed: Oct. 6, 1986

[51] Int. Cl.$^4$ .......................... H05B 6/64; A23F 3/00
[52] U.S. Cl. ............................ 219/10.55 E; 99/323.3; 210/155
[58] Field of Search ................. 219/10.55 E, 10.55 R, 219/10.55 A, 10.55 M; 210/155; 99/323.3

[56] References Cited

U.S. PATENT DOCUMENTS

| 210,464 | 9/1863 | Barritt | 99/323.3 |
| 1,238,759 | 9/1917 | Gonsalves | 99/323.3 |
| 2,072,324 | 3/1937 | Wolcott | 210/155 |
| 2,686,597 | 8/1954 | Lilja | 210/163.5 |
| 2,731,907 | 1/1956 | Brown | 99/316 |
| 4,086,848 | 5/1978 | Hahn | 99/323 |

Primary Examiner—Robert S. Macon
Attorney, Agent, or Firm—Bean, Kauffman & Bean

[57] ABSTRACT

A brewer assembly which is particularly useful for preparing small quantities of coffee or the like in a microwave oven, comprised of a cup for accepting the charge of ground coffee and water, and a lid in the configuration of an inverted basket with a plurality of screen-covered openings for filtering the brewed beverage as it is poured from the cup. A stem-shaped tube extends above the top surface of the lid forming a lid handle whose interior provides a channel for venting the steam generated during the heating process. The tube extends below the top surface of the lid to prevent the discharge of the unfiltered brewing mixture through the vent opening when the device is tipped for discharging the finished beverage.

8 Claims, 3 Drawing Figures

MICROWAVE BREWING CUP

BACKGROUND OF THE PRESENT INVENTION

1. Field of the Invention

This invention pertains to coffee brewers and more particularly to an apparatus comprised of a cup for brewing coffee therein which is covered by a screened lid for filtering the brewed beverage as it is being poured from the cup.

2. Description of Prior Art

Various devices for brewing coffee are known. The types which employ separate filtering chambers are generally satisfactory for larger volumes but are not sufficiently quick or convenient for brewing small amounts, such as a single cup. They are also complex and costly in construction and require disassembly for cleaning after each use. Some prior art devices require paper filters which are expensive, messy to handle and may not always be available.

A common problem with all types of coffee filters is that they become clogged with grounds which diminishes the liquid flow through the filter and thereby prolongs the brewing process.

One solution to this problem is the plunger pot, whereby upon brewing, a metal strainer is forced down through the coffee like a plunger, pushing the grounds to the bottom and leaving a clarified coffee beverage above. However, this device is expensive to produce and due to its metal parts is not suitable for use in a microwave oven. Also, the relatively coarse metal screen filters poorly and produces a coffee beverage with a "muddy" appearance.

A simple technique for brewing coffee is the so-called pot method in which the coffee grounds are placed into a container of heated water and allowed to steep. While the flavoring constituents are extracted very quickly with this method, a lengthy waiting period is required for the grounds to settle before the coffee can be poured from the container.

Microwave ovens are now widely in use which are able to heat small quantities of water very quickly. However, microwave coffee makers with separate filtering chambers or other features adopted from conventional coffee makers are still not sufficiently quick or convenient for brewing individual servings of coffee.

SUMMARY OF THE INVENTION

It is the prime object of this invention to provide a simple, easily-operated device which is particularly suitable for quickly brewing small amounts of coffee, such as a single cup.

Another object of this invention is to provide a coffee maker assembly capable of delivering a coffee beverage immediately upon the water reaching brewing temperature without requiring further manipulation or waiting period for other brewing processes. In addition to achieving a quick cycle time, such a device also permits the operator to control coffee aroma by terminating the brewing process immediately after the desired degree of flavor extraction has been achieved.

A further object of this invention is to provide a device which can use microwaves for quickly heating the water to brewing temperature.

A still further object of this invention is to provide a low cost coffee brewer which can be manufactured inexpensively from a minimum number of plastic molded components.

Accordingly, with this invention, water and ground coffee are inserted into a cup and covered with a screened lid. After heating the contents approximately to boiling temperature the finished beverage can be poured from the cup whereupon the screened lid filters the beverage and retains the spent coffee grounds in the device.

Since the coffee powder is immersed in the water right at the beginning of the brewing cycle, extraction of the flavoring constituents starts immediately. Furthermore, convection currents occuring spontaneously in the heating water produce a mixing action on the ingredients which further speeds up the brewing process.

This invention overcomes the problem of a prolonged filtering time requirement due to a clogged coffee filter by providing a screened lid in the configeration of an inverted basket with a large total filtering area. The ratio of filtering area per liquid volume is also maximized by providing a brewing cup with outwardly tapering sidewalls for receiving a large filtering lid at its mouth. The basket size can thereby be made sufficiently large to receive all of the coffee grounds in the cup without becoming filled up or obstructing the filtering area when the device is tipped for pouring the brewed coffee beverage.

Another object of this invention is to provide a finely filtered coffee beverage which is generally considered to be more attractive and desirable. Accordingly, the lid is provided with a plurality of openings which are covered with fine-mesh filtering material.

It was found that such a filter impedes the passage of the steam generated by the brewing process, thereby causing a pressure build-up in the device which can dislodge the lid from the cup. The lid is therefore provided with a venting tube to permit the escape of expanding gases.

The tube extends above the top surface of the lid to form a stem-shaped lid handle.

To prevent the escape of the unfiltered brewing mixture through the vent opening when the device is tipped, the venting tube is extended downwardly below the top surface of the lid to form a liquid retainer in the inverted position.

Further objects and advantages of this invention will become apparent from a consideration of the drawings and ensuing description of it.

DESCRIPTION OF THE PREFERRED EMBODIMENT

Figure 1:
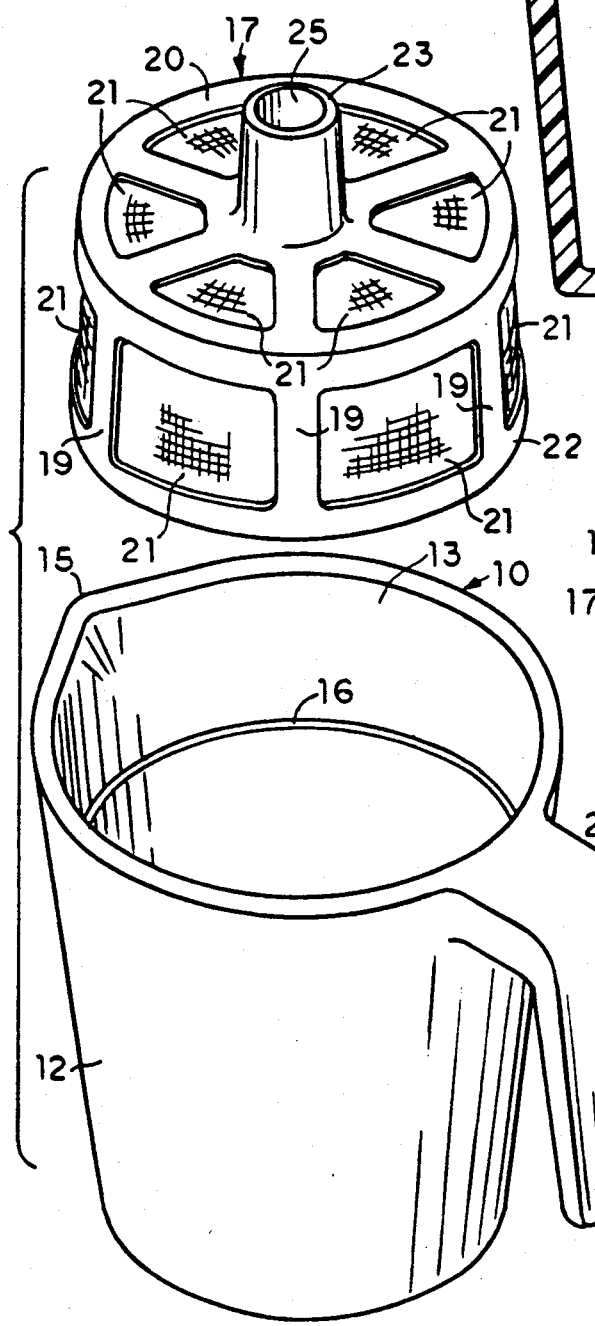
FIG. 1 is an exploded perspective view of the lid and the cup of the invention.

Referring to the drawings, FIG. 1 shows a coffee maker comprised of a cup 10 and a lid 17 for covering the cup. Referring to the cup, it is seen that it has a closed bottom 11 and sidewalls 12 tapering outwardly towards an open mouth 13. The cup is provided with a handle 14 and a pouring spout 15 at its upper end located oppositely from the handle. The inside of the cup is provided with an annular abuttment shoulder 16 for limiting the maximum engagement depth of the lid and to serve as a fill line marker for designating the recommended liquid level.

A lid 17 is provided which telescopicaly engages into the the mouth of the cup 10. The bottom rim 22 of the lid is of a size which mates frictionally and forms a sealing surface with the inside of the cup sidewalls 12 at depth below the spout 15 and above the annular abuttment shoulder 16. The lid is formed by a screen-covered frame structure with an open bottom 18 an encompassing sidewall 19 and a top surface 20 for straining the brewed beverage as it is poured from the cup. While the preferred embodiment has screen-covered openings 21, it is recognized that other means of filtering such as perforations and slots may be used. Accordingly the term filtering opening is used in the appended claim for purposes of generically describing any opening suitable for filtering purposes. In the preferred embodiment, filtering openings are provided all around the periphery, however, it is recognized that such openings may be provided for only part of the periphery preferably on the order of 180 degrees. A stem-shaped tube 23 protrudes above the top of the lid forming a lid handle whose interior 25 functions as a channel for venting the steam generated during the heating process. The tube 23 has an extension 24 protruding below the top surface of the lid which prevents the unfiltered brewing mixture 27 from flowing out through the vent opening 25 when the cup is tipped for discharging the finished beverage, as shown in FIG. 3.

Figure 2:
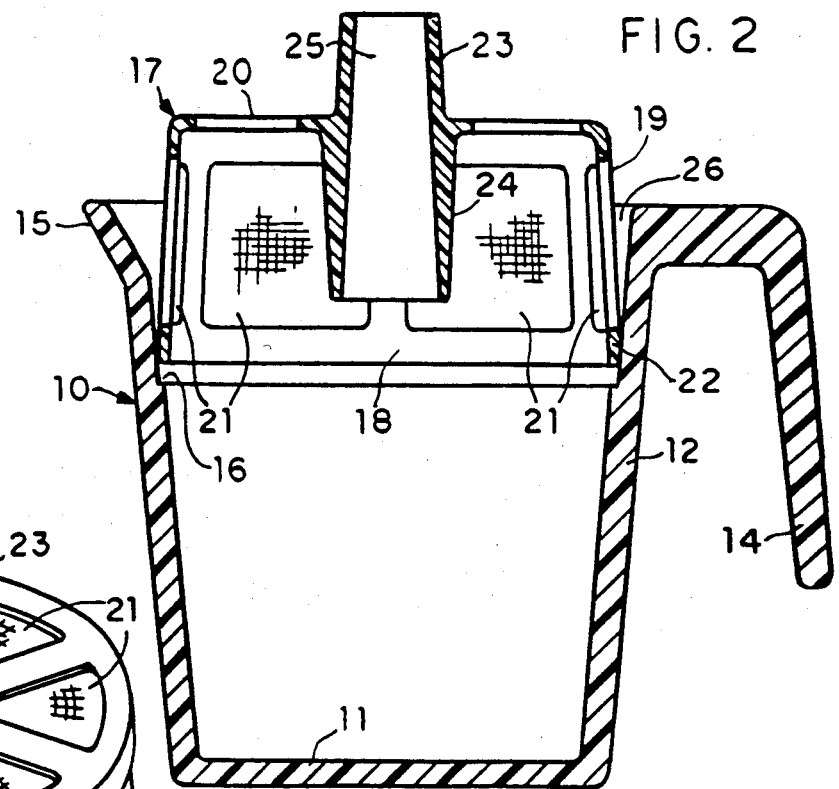
FIG. 2 is a vertical cross-section of the assembled coffee maker taken along a line passing through the centers of the spout and the handle.
Figure 3:
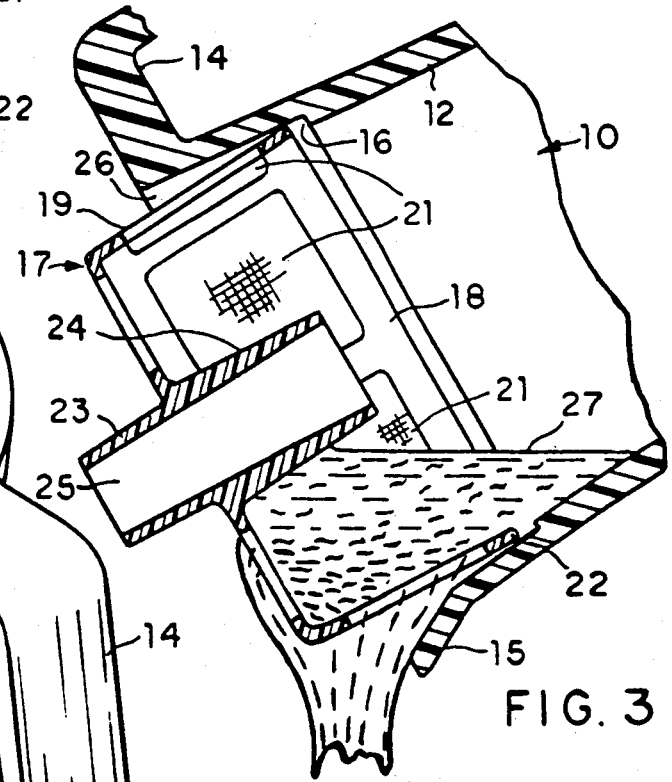
FIG. 3 is a partial view of FIG. 2, rotated to show the brewed beverage being poured from the cup.

As is apparent from FIGS. 2 and 3, the sidewalls 12 of the cup and the sidewalls 19 of the lid are tapered in opposite directions, which provides a narrow space 26 between them for liquid passage from the screen-covered openings 21 in the sidewalls 19 of the lid.

The components of this invention may be constructed of microwave transparent, plastic materials such as polyester, polysulfone, polycarbonate or polypropolene whereby coffee may be brewed very quickly in a microwave oven. The filtering lid may be fabricated by insert molding, whereby sized plastic screening material such as a polyester or nylon screening is placed into a mold which is then closed and injected with a plastic material to form the frame of the lid basket.

In carrying out the operation of the present invention, ground coffee and sufficient water to bring the liquid level up to the annular abuttment shoulder 16 are placed into the cup 10. The lid 17 is pushed into the upper portion of the cup and the contents are heated by microwaves or other heat sources. After reaching the desired brewing temperature, the coffee maker assembly is removed from the heat source and tipped to pour off the finished beverage. which is filtered as it flows through the screen-covered openings in the attached lid. The spent grounds are retained in the device and may be rinsed away for clean-up.

While this device may be enlarged for brewing greater amounts, it was found that its prime advantage of being faster and more convenient than prior art is only applicable to volumes not much in excess of one cup. As the device becomes larger, the ratio of filter area to liquid volume decreases since these ratios increase by the square and the cube of the physical dimensions respectively. As a result the filtering time increases to the point of becoming inconvenient for hand operation due to the hot steam arising from the pouring coffee. In addition the microwaving time increases and it becomes more difficult to maintain the frictional engagement of the lid during tipping with a larger and therefore heavier liquid volume.

Whereas the drawings and accompanying descriptions have shown and described a preferred embodiment of the present invention it should be apparent to those skilled in the art that various changes may be made in the form of the invention without effecting the scope thereof.

For example, it is alternately possible to provide different retaining means for the lid such as a hinge, a snap fit or a means for manually holding it onto the cup when discharging the coffee beverage. It is also apparent that departures may be made in the configerations of the lid and the cup and that an electric heating element may be incorporated into the device.

What is claimed is:

1. A microwave transparent brewer assembly for brewing coffee or the like within the confines of a microwave oven, said assembly comprising:
    a cup having a bottom wall and a side wall terminating in an open mouth for receiving ground coffee or the like and water to be heated to a brewing temperature for producing brewed coffee or the like; and
    a lid removably fixed to said cup for covering said mouth and straining said brewed coffee incident to pouring thereof from said cup, said lid having a top surface and a side wall depending therefrom and terminating in a bottom rim bounding an open bottom of said lid, said rim removably engaging and forming a fluid seal with said side wall of said cup inwardly of said mouth, at least one of said top surface and said side wall of said lid having filtering openings extending therethrough for straining said brewed coffee, and said top surface having a vent means opening therethrough, said vent means including an extension depending from said top surface and cooperating with said top surface and said side wall of said lid to define a retainer for said grounds when said cup is tipped for pouring said brewed coffee through said filtering openings, while preventing escape of said brewed coffee and said grounds through said vent means.

2. An assembly according to claim 1, wherein said vent means includes a second extension upstanding from said top surface for defining a handle for said lid.

3. An assembly according to claim 1, wherein said side wall of said lid tapers outwardly from adjacent said top surface towards said rim, said strainer openings are provided in at least said side wall of said lid, and said side wall of said cup tapers inwardly from adjacent said mouth and defines an abutment means for limiting insertion of said lid into said cup and for providing a fill line marker for said cup.

4. An assembly according to claim 1, wherein said strainer openings are provided in both said top surface and said side wall of said lid.

5. An assembly according to claim 1, wherein said vent means is positioned centrally of said top surface.

6. An assembly according to claim 5, wherein said strainer openings are provided in both said top surface and said side wall of said lid.

7. An assembly according to claim 6, wherein said vent means includes a second extension upstanding from said top surface for defining a handle for said lid.

8. An assembly according to claim 7, wherein said side wall of said lid tapers outwardly from adjacent said top surface towards said rim and said side wall of said cup tapers inwardly from adjacent said mouth and defines an abutment means for limiting insertion of said lid into said cup and for providing a fill line marker for said cup.

* * * * *